(12) United States Patent
Madduri et al.

(10) Patent No.: US 10,821,990 B2
(45) Date of Patent: Nov. 3, 2020

(54) COGNITIVE MODELING FOR ANOMALIES DETECTION IN DRIVING

(71) Applicant: International Business Machines Corporation, Armonk, NY (US)

(72) Inventors: Hari H. Madduri, Austin, TX (US); Pu Yang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 15/935,716

(22) Filed: Mar. 26, 2018

(65) Prior Publication Data

US 2019/0291738 A1    Sep. 26, 2019

(51) Int. Cl.
*B60W 40/09* (2012.01)
*G07C 5/00* (2006.01)
*G07C 5/08* (2006.01)

(52) U.S. Cl.
CPC .......... *B60W 40/09* (2013.01); *G07C 5/008* (2013.01); *B60W 2520/10* (2013.01)

(58) Field of Classification Search
CPC .... B60W 40/09; B60W 2520/10; G07C 5/008
USPC .......................................................... 701/1
See application file for complete search history.

(56) References Cited

U.S. PATENT DOCUMENTS

| | | | |
|---|---|---|---|
| 8,634,822 B2 | 1/2014 | Silver et al. | |
| 8,989,914 B1 | 3/2015 | Nemat-Nasser et al. | |
| 9,050,935 B2 | 6/2015 | Stefan et al. | |
| 9,141,995 B1 | 9/2015 | Brinkmann et al. | |
| 9,761,067 B2 | 9/2017 | Plante et al. | |
| 2014/0309849 A1 | 10/2014 | Ricci | |
| 2015/0091713 A1 | 4/2015 | Kohlenberg et al. | |
| 2016/0086397 A1* | 3/2016 | Phillips | G07C 5/0808 701/32.4 |
| 2016/0300242 A1 | 10/2016 | Truong et al. | |
| 2016/0375908 A1 | 12/2016 | Biemer | |
| 2017/0039890 A1* | 2/2017 | Truong | G09B 19/167 |

OTHER PUBLICATIONS

Wikipedia, "Driver drowsiness detection", Wikipedia, https://en.wikipedia.org/wiki/Driver_drowsiness_detection, Mar. 23, 2018.

* cited by examiner

*Primary Examiner* — Marthe Y Marc-Coleman
(74) *Attorney, Agent, or Firm* — North Shore Patents, P.C.; Joseph L. Acayan

(57) ABSTRACT

Embodiments generally relate to detection of anomalies in driving. In some embodiments, a method includes receiving first vehicle data during operation of a vehicle, wherein the first vehicle data is associated with a plurality of vehicle parameters. The method further includes determining a first signature based on the first vehicle data, wherein the first signature indicates first driving behavior. The method further includes receiving second vehicle data during operation of the vehicle, wherein the second vehicle data is associated with the plurality of vehicle parameters. The method further includes determining a second signature based on the second vehicle data, wherein the second signature indicates second driving behavior. The method further includes performing one or more remediating actions based on the second signature.

20 Claims, 5 Drawing Sheets

COGNITIVE MODELING FOR ANOMALIES DETECTION IN DRIVING

BACKGROUND

Internet of things is gaining momentum in many fields. Connected cars, for example, have sensors for detecting speed, steering wheel movements, and direction of a vehicle. Systems may use such information to detect if the driver of the vehicle is fatigued or drowsy, and, if so, warn the driver. Some systems are capable of identifying the driver of a car. For example, a system may distinguish between different drivers based on different key fobs used by each driver. Some systems may distinguish between different drivers based on detection of different weights or heights of different drivers. Some system may have cameras and facial recognition to recognize drivers. Some systems may analyze the driving patterns to classify drivers. While this is the existing art, current systems cannot identify a casual driver driving in an abusive manner.

SUMMARY

Disclosed herein is a method for detecting anomalies in driving, and a system and computer program product as specified in the independent claims. Embodiments are given in the dependent claims. Embodiments can be freely combined with each other if they are not mutually exclusive.

In an embodiment, a method includes receiving first vehicle data during operation of a vehicle, wherein the first vehicle data is associated with a plurality of vehicle parameters. The method further includes determining a first signature based on the first vehicle data, wherein the first signature indicates first driving behavior. The method further includes receiving second vehicle data during operation of the vehicle, wherein the second vehicle data is associated with the plurality of vehicle parameters. The method further includes determining a second signature based on the second vehicle data, wherein the second signature indicates second driving behavior. The method further includes performing one or more remediating actions based on the second signature.

In another aspect, the first signature is associated with a first driver. In another aspect, the second signature is associated with a second driver. In another aspect, the method further includes comparing the first signature with the second signature; and determining a driver of the vehicle based on the comparing of the first signature with the second signature. In another aspect, the vehicle parameters comprise speed characteristics. In another aspect, the vehicle parameters comprise a geographic location. In another aspect, the vehicle parameters comprise rotations per minute. In another aspect, the vehicle parameters include one or more of a direction of the vehicle, changes in the direction, and a rate of change of the direction.

DETAILED DESCRIPTION

Embodiments described herein facilitate detection of anomalies in driving. Such anomalies may be used to determine if the current driver of a vehicle is not the primary driver, and how the vehicle is being driven.

In some embodiments, a system receives first vehicle data during operation of a vehicle, where the first vehicle data is associated with vehicle parameters (e.g., average speed, geographic location, etc.). The system then determines a first signature based on the first vehicle data, where the first signature indicates first driving behavior. In some embodiments, the first driving behavior is associated with a primary driver of the vehicle (e.g., the owner of the vehicle).

In a different driving session, the system receives second vehicle data during operation of the vehicle, where the second vehicle data is associated with the vehicle parameters. The system determines a second signature based on the second vehicle data, wherein the second signature indicates second driving behavior. In some embodiments, the second driving behavior is associated with a secondary driver of the vehicle (e.g., not the owner of the vehicle). The secondary driver may be an authorized driver or a stranger. Upon determining that the secondary driver is not the primary driver, the system performs one or more remediating actions based on the second signature. An example use case is that the system may detect bad driving by a valet parking driver and inform the owner immediately.

Figure 1:
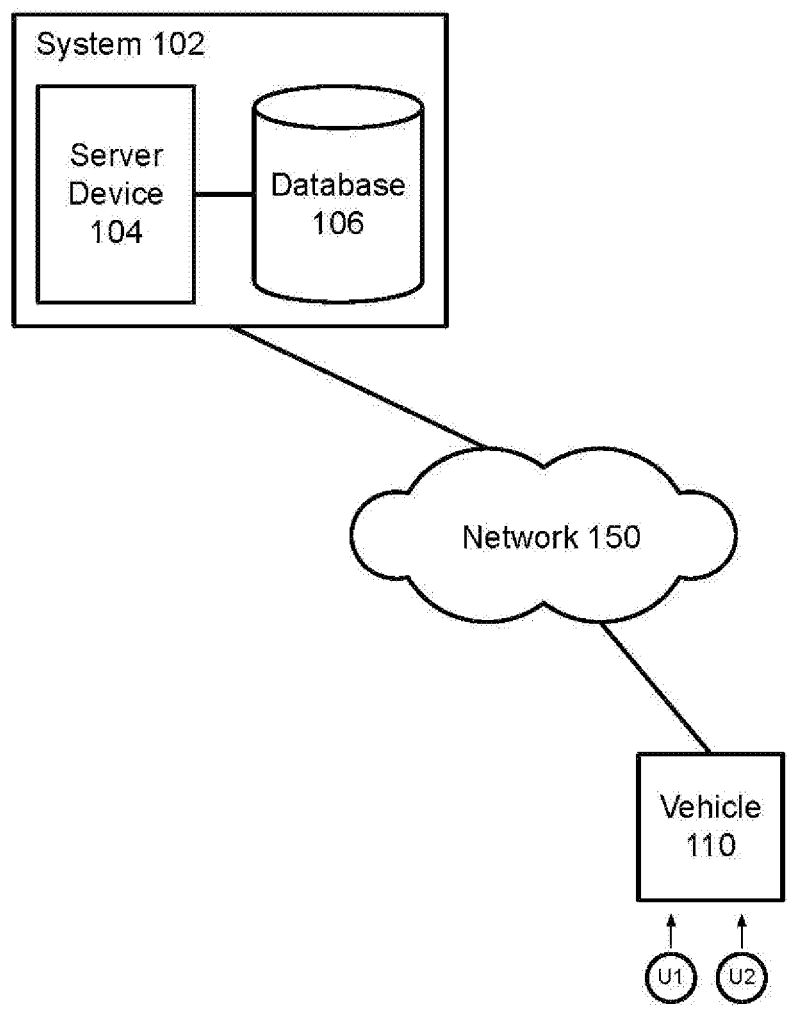
FIG. 1 is an example environment for detecting anomalies in driving, according to some embodiments.

FIG. 1 is an example environment 100 for detecting anomalies in driving, according to some embodiments. Shown is a system 102, which includes a server device 104 and a database 106. The system 102 communicates with vehicles such as vehicle 110 via a communications network 150. The communications network 150 may be any network such as a wireless local area network (WLAN), the Internet, or any combination thereof including other networks. In various embodiments, the vehicle 110 includes sensors and collects data. Vehicle 110 sends the data to the system 102, via the communications network 150.

As described in more detail herein, the system 102 analyzes incoming vehicle data associated with a vehicle such as vehicle 110. The incoming data may include data associated with various vehicle parameters such as driving speed, geographic location, etc. The values associated with the vehicle parameters provide a profile or signature of the driving (driving signature). Different driving signatures are associated with different drivers. The system performs one or more remediating actions based on detection of a current driver who is different from the primary driver. For example, the system may alert the primary driver or owner of the vehicle that another driver is driving the vehicle. Other example remediating actions are described in more detail herein.

For ease of illustration, FIG. 1 shows one block for each of system 102, server device 104, and database 106, and shows one block for vehicle 110. Blocks 102, 104, and 106 may represent multiple systems, server devices, and databases. Also, there may be any number of vehicles that the system 102 monitors. In other implementations, environment 100 may not have all of the components shown and/or may have other elements including other types of elements instead of, or in addition to, those shown herein. In various implementations, user U1 may represent the primary driver of the vehicle 110, and U2 may represent a secondary driver of the vehicle.

While the server 102 performs embodiments described herein, in other embodiments, any suitable component or combination of components associated with the server 102 or any suitable processor or processors associated with the server 102 may facilitate performing the embodiments described herein. In various embodiments, the environment 100 may not have all of the components shown and/or may have other elements including other types of components instead of, or in addition to, those shown herein.

Figure 2:
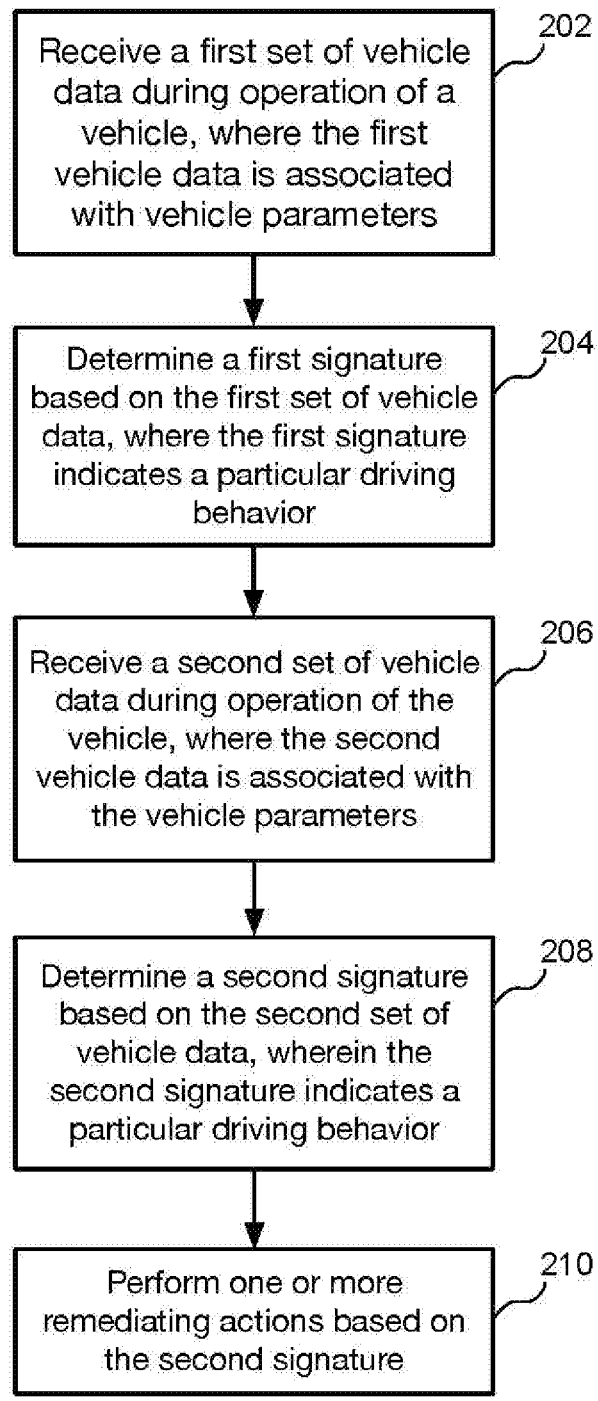
FIG. 2 is an example flow diagram for detecting anomalies in driving, according to some embodiments.

FIG. 2 is an example flow diagram for detecting anomalies in driving, according to some embodiments. Referring to both FIGS. 1 and 2, a method begins at block 202, where a system such as system 102 receives a first set of vehicle data during operation of a vehicle, where the first vehicle data is associated with vehicle parameters. For example, in some embodiments, the vehicle parameters may include speed characteristics. For example, the speed characteristics may include speed, acceleration, deceleration, etc.

Figure 3:
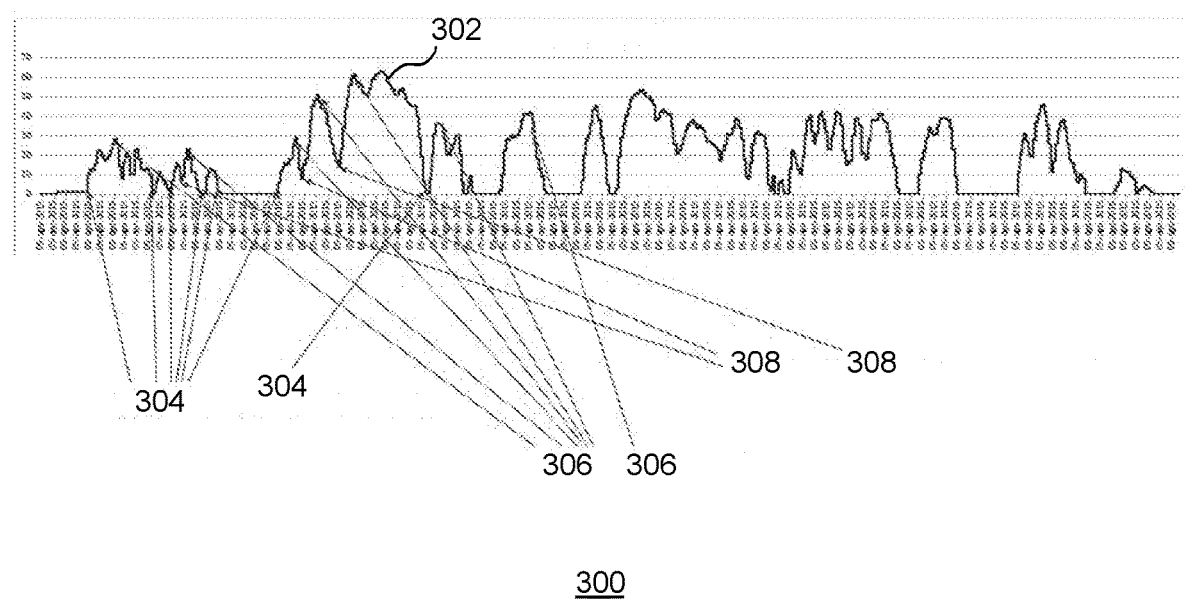
FIG. 3 is an example graph showing captured vehicle data, including the speed of a vehicle as a function of time, according to some embodiments.

FIG. 3 is an example graph 300 showing captured vehicle data, including the speed of a vehicle as a function of time, according to some embodiments. In this example, the vertical axis or y-axis represents the speed of a vehicle such as the vehicle 110, and the horizontal axis or x-axis represents time. The system 102 retrieves the vehicle data from the vehicle 110 via the network 150. The system 102 may store the vehicle data in the database 106 of FIG. 1, or any suitable database.

In this example embodiment, the vehicle parameter is speed. The graph 300 includes raw data values associated with the speed parameter. Values for other vehicle parameters may also be extracted from the vehicle data, and the particular vehicle data extracted may vary and will depend on the particular implementation.

Shown is a plot or line 302 that represents the speed of the vehicle 110 as a function of time. As shown, the speed varies with time. The speed variance may result from other cars in front of the vehicle 100 varying in speed, stoplights, stop signs, etc.

As shown, zeros 304 are portions of the line 302 where the vehicle is stopped (lowest lower bound). For example, the speed may be at a zero 304 when the vehicle is stopped at the stop sign or traffic signal. Each zero may last for a certain time period (e.g., a second or so for a stop sign, 30 seconds or so for a stop light, etc.). The system extracts the zeros 304 with timestamps from the vehicle data.

Also shown are peaks 306. The peaks 306 are portions of the line 302 where the vehicle reaches a maximum speed (local maxima). For example, the speed may be at a peak 306 when the vehicle is reaches a top speed before needing to slow down (e.g., for another car, a stop sign, a traffic signal, etc.). The system extracts the peaks 306 with timestamps from the vehicle data.

Also shown are valleys 308. The valleys 308 are portions of the line 302 where the vehicle reaches a minimum speed without actually stopping (local minima). For example, the vehicle 110 may slow down due another car in front and then immediately speed up if the other car speeds up. The system extracts the valleys 308 with timestamps from the vehicle data.

In some embodiments, the system may measure how fast the driver goes from a zero 304 to a peak 306 (e.g., up slope/acceleration, or $S_p$), or from a peak 306 to a valley 308 (e.g., down slope/deceleration, or $S_v$). The system may measure how long a driver stays at a peak 304 before a descent. In some embodiments, the system detects a small delta around each peak 304 (e.g., +/−5% of peak value). The percentage may vary and will depend on the particular implementation. As long as the speed is maintained within +1-5% of the peak, they system may consider the speed as staying at the peak 306, or $T_p$. Likewise, the system may measure the time that a vehicle stays at each valley 308, or $T_v$. The system may also measure the time between two idling periods, or zeros 304. In various embodiments, the time between two zeros 304 represents a journey segment, and a given drive may include a number of journey segments. An example journey segment is described in more detail herein in connection with FIG. 4.

The particular vehicle parameters may vary depending on the particular implementation. For example, in some embodiments, the vehicle parameters may include a geographic location. The geographic location may be indicated by global positioning system (GPS) coordinates. In some embodiments, the vehicle parameters may include one or more of the direction of the vehicle, changes in the direction, and the rate of change of the direction. In various embodiments, the vehicle direction is a measured parameter. The change in vehicle direction (e.g., north, south, east, west, etc.) by magnitude (e.g., number of degrees, etc.) and the rate of change of the direction (e.g., how fast the direction changes, how often the direction changes, etc.) may indicate abusive or reckless driving (e.g., whether the driver is swerving too much, too often, including hard breaking indicated by sudden deceleration, etc.). In some embodiments, the vehicle parameters may include rotations per minute (RPM) engine's crankshaft.

At block 204, the system determines a first signature based on the first set of vehicle data, where the first signature indicates a particular driving behavior. The first signature is the driving pattern or driving characteristics of the primary driver and may be referred to as the first driving signature. In various embodiments, the driving behavior indicated by the first signature is associated with the primary driver of the vehicle. The primary driver may be the owner of the vehicle, for example. In some embodiments, the first signature is associated with a first driver, where the first driver is the owner of the vehicle. As described in more detail herein, the driving signature of the primary driver may be compared to the driving signature of other drivers.

Figure 4:
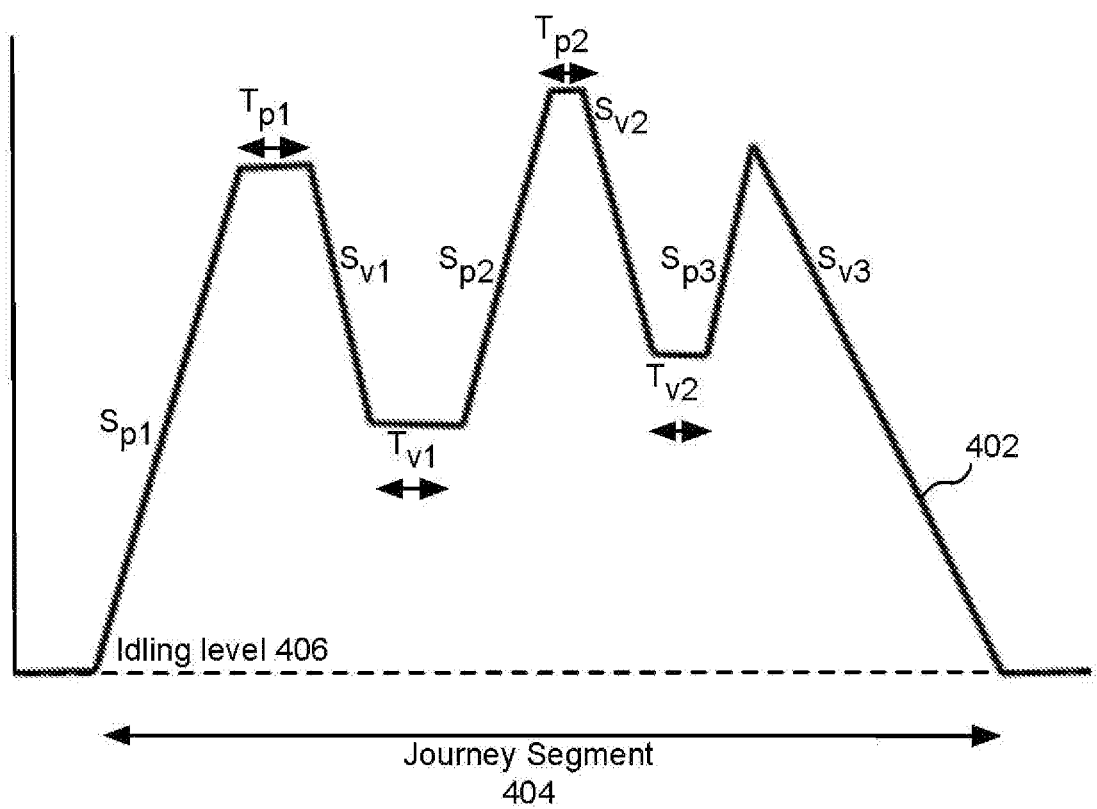
FIG. 4 is an example graph showing refined vehicle data, including the speed of a vehicle as a function of time, according to some embodiments.

FIG. 4 is an example graph 400 showing refined vehicle data, including the speed of a vehicle as a function of time, according to some embodiments. In this example, the vertical axis or y-axis represents the speed of a vehicle such as the vehicle 110, and the horizontal axis or x-axis represents time.

In various embodiments, the system 102 retrieves the captured vehicle data from the database 106 of FIG. 1, or other suitable database. The system 102 refines the captured vehicle data in order to provide refined vehicle data, where the refined vehicle data is an approximated or smoothed version of the raw captured data. For example, in some embodiments, the system may analyze the waveform of the captured vehicle data in order to extract zeros, peaks, and valleys.

In this example embodiment, the vehicle parameter is speed. The graph 400 includes refined data values associated with the speed parameter. The particular types of refined vehicle data that are graphed may vary and will depend on the particular implementation. For example, in some embodiments, the system may process steering and/or direction parameters, etc.

Shown is a plot or line 402 that represents the speed of the vehicle 110 as a function of time. As shown, the speed varies with time over a journey segment 404. The speed variance may result from other cars, stoplights, stop signs, etc. In this example, the time period shown in the graph 400 spans over a journey segment 404.

As shown, the vehicle starts at a zero or idling level 406. The vehicle then accelerates toward a peak speed at a first acceleration phase $S_{p1}$. The vehicle then reaches a peak cruising speed at a first peak cruising phase $T_{p1}$. The vehicle then decelerates to a valley speed at a first deceleration phase $S_{v1}$. The vehicle then reaches a valley cruising speed at a first valley cruising phase $T_{v1}$.

The vehicle then accelerates toward another peak speed at a second acceleration phase $S_{p2}$. The vehicle then reaches a peak cruising speed at a second peak cruising phase $T_{p2}$. The vehicle then decelerates to a valley speed at a second deceleration phase $S_{v2}$. The vehicle then reaches a valley cruising speed at a second valley cruising phase $T_{v2}$.

The vehicle then accelerates toward another peak speed at a third acceleration phase $S_{pa}$. The vehicle then decelerates to a valley speed at a third deceleration phase $S_{v3}$. The journey segment finally ends with the vehicle reaching the idling level 406.

Based on the refined vehicle data, the system determines a signature. The signature may include various attributes or characteristics, also referred to as features. For example, the signature may include a number of peaks, peak density, a number of valleys, valley density, an average acceleration, an average deceleration, etc. These are some examples of signatures (attributes/characteristics/features). However, the possible signature aspects are not limit to the above examples.

At block 206, the system receives a second set of vehicle data during operation of the vehicle, where the second vehicle data is associated with the vehicle parameters. In various embodiments, the second set of vehicle data may be described similarly to the first set of vehicle data as described in connection with FIG. 3.

At block 208, the system determines a second signature based on the second set of vehicle data, wherein the second signature indicates a particular driving behavior. The second signature is the driving pattern or driving characteristics of a secondary driver and may be referred to as the second driving signature. In various embodiments, the second set of vehicle data may be described similarly to the first set of vehicle data as described in connection with FIG. 4.

In this example embodiment, the first signature and the second signature are different. As such, the driving behavior associated with the second signature indicates that a driver other than the primary driver is currently driving the vehicle. In various embodiments, the driving behavior indicated by the second signature is associated with a secondary or non-primary driver of the vehicle.

In some embodiments, the second signature is associated with a secondary driver, and where the secondary driver is the current driver of the vehicle. The secondary driver may be friend or relative of the owner of the vehicle, for example. In some scenarios, the secondary driver may be an unauthorized driver or stranger (e.g., someone who stole the vehicle).

In some embodiments, the system compares the first signature with the second signature. When someone else (not the primary driver) drives the same vehicle, the driving pattern or signature will be different from that of the primary driver. In other words, the second driving signature will not match the first driving signature. As such, the system determines the driver of the vehicle (e.g., whether the primary driver or a secondary driver) based on the comparing of the first signature with the second signature. As described in more detail herein, the system may alert the primary driver or perform other remediating actions.

Not only does the system detect when the current driver is not the primary driver, but the system also determines how the current driver is driving based on the driving signature. For example, the system can detect if the current driver is driving erratically. In an example scenario, the secondary driver may be authorized to drive the vehicle (e.g., a relative or valet parker), but the secondary driver may be driving erratically and/or abusing the vehicle (e.g., breaking hard, turning hard, etc.). An advantage of embodiments described herein is the immediate recognition of bad driving (e.g., by a family member, by a valet parking attendant, repair shop worker, etc.).

In some embodiments, the driving behavior is characterized by one or more of: number of peaks per journey segment $T_0$ (peak density); number of valleys per journey segment $T_0$ (valley density); non-cruising time=$T_{nc}$=$T_0$−$(T_{p1}+T_{p2}+T_{v1}+T_{v2})$; average acceleration=$(S_{p1}+S_{p2}+S_{p3})/3*T_{nc}$; and average deceleration=$(S_{v1}+S_{v2}+S_{v3})/3*T_{nc}$, or any combination thereof.

Once the system captures the data (which can be in a stream), the system may compute one or more of the following features for each journey segment: peak density, valley density, average acceleration, average deceleration, or combination thereof.

While certain driving characteristics are described herein, it is possible to include other features in a given driving signature such as rapid turns (measured by the rate of change of direction in the x-y plane, e.g., the angular acceleration) that also characterize a person's driving pattern (e.g., rash versus regular, etc.). In some embodiments, the system may track other factors such as driving conditions, which may affect the above features. Such driving conditions may include, for example, rain, road conditions, traffic, time of day, etc., which the system may include in a more elaborate model.

In some embodiments, the system may compute the signature of a driver, and generate a tuple of one or more of the characteristics described herein (peak density, valley density, average acceleration, average deceleration, or combination thereof). For the same driver and car, any of the characteristics mentioned herein would be fairly predictable, given a set of driving conditions (e.g., driving to work everyday).

At block 210, the system performs one or more remediating actions based on the second signature. That is, the system distinguishes between different drivers in real-time, and responds accordingly. For example, the system may send an alert to the primary driver or owner of the vehicle. Based on determining that the first driver signature and the second driver signature are not the same, the system determines that the drivers are different and may perform a remediating action as appropriate. For example, the system may send a command to the vehicle to limit its speed, to pull over to a safe stop, etc. In some implementations, the system may notify the primary driver or owner of the vehicle or other third party how the vehicle is being driven (e.g., dangerously, etc.).

In some embodiments, the system may detect a stranger driving a vehicle. For example, the system may compute the driving signature as soon as someone drives the car. The system then compares the driving signature with a stored driving signature (e.g., signature of the primary driver or owner of the vehicle.) A difference may trigger a desired remedial action. The desired remedial action may be any of several pre-programmed choices (e.g., send a text message to a phone, inform law enforcement, bring the car to a safe stop and stall, etc.).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 5:
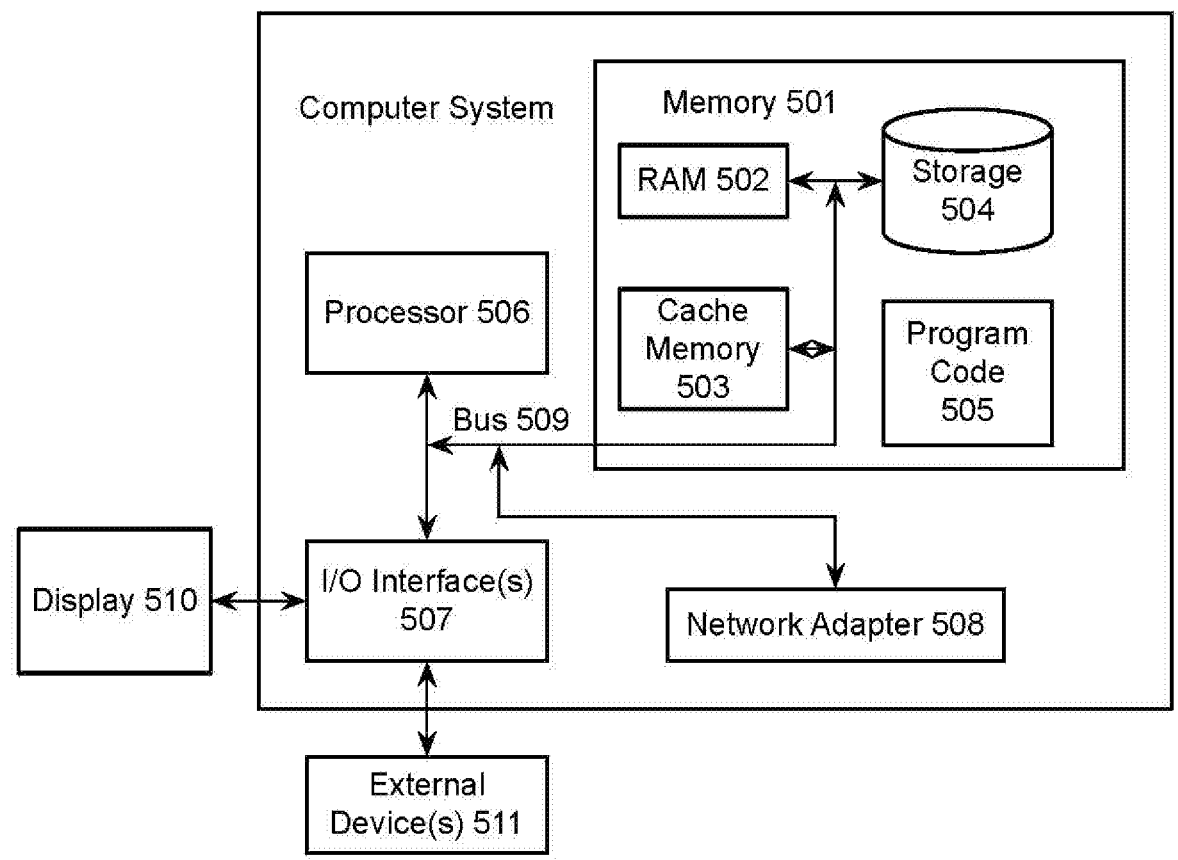
FIG. 5 is a block diagram of an example computer system, which may be used for embodiments described herein.

FIG. 5 is a block diagram of an example computer system 500, which may be used for embodiments described herein. The computer system 500 is operationally coupled to one or more processing units such as processor 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or storage 504, which may include non-volatile storage media or other types of memory. The memory 501 may include at least one program product having a set of at least one program code module such as program code 505 that are configured to carry out the functions of embodiment of the present invention when executed by the processor 506. The computer system 500 may also communicate with a display 510 or one or more other external devices 511 via input/output (I/O) interfaces 507. The computer system 500 may communicate with one or more networks via network adapter 508.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   at least one processor and a computer readable storage medium having program instructions embodied therewith, the program instructions executable by at least one processor to cause the at least one processor to perform operations comprising:
   receiving first vehicle data during operation of a vehicle, wherein the first vehicle data is associated with a plurality of vehicle parameters;
   determining a first signature based on the first vehicle data, wherein the first signature indicates first driving behavior, wherein the first signature comprises a first waveform of captured first vehicle data, and wherein the first waveform represents changes in at least one parameter of the plurality of vehicle parameters;
   receiving second vehicle data during operation of the vehicle, wherein the second vehicle data is associated with the plurality of vehicle parameters;
   determining a second signature based on the second vehicle data, wherein the second signature indicates second driving behavior, wherein the second signature comprises a second waveform of captured second vehicle data, and wherein the second waveform represents changes in at least one parameter of the plurality of vehicle parameters; and
   performing one or more remediating actions based on the second signature based on a comparison between the first signature and the second signature.

2. The system of claim 1, wherein the first signature is associated with a first driver.

3. The system of claim 1, wherein the second signature is associated with a second driver.

4. The system of claim 1, wherein the at least one processor further performs operations comprising:
   comparing the first signature with the second signature; and
   determining a driver of the vehicle based on the comparing of the first signature with the second signature.

5. The system of claim 1, wherein the vehicle parameters comprise speed characteristics.

6. The system of claim 1, wherein the vehicle parameters comprise a geographic location.

7. The system of claim 1, wherein the vehicle parameters comprise rotations per minute.

8. A computer program product comprising a computer readable storage medium having program instructions embodied therewith, the program instructions executable by at least one processor to cause the at least one processor to perform operations comprising:
   receiving first vehicle data during operation of a vehicle, wherein the first vehicle data is associated with a plurality of vehicle parameters;
   determining a first signature based on the first vehicle data, wherein the first signature indicates first driving behavior, wherein the first signature comprises a first waveform of captured first vehicle data, and wherein the first waveform represents changes in at least one parameter of the plurality of vehicle parameters;
   receiving second vehicle data during operation of the vehicle, wherein the second vehicle data is associated with the plurality of vehicle parameters;
   determining a second signature based on the second vehicle data, wherein the second signature indicates second driving behavior, wherein the second signature comprises a second waveform of captured second vehicle data, and wherein the second waveform represents changes in at least one parameter of the plurality of vehicle parameters; and
   performing one or more remediating actions based on the second signature based on a comparison between the first signature and the second signature.

9. The computer program product of claim 8, wherein the first signature is associated with a first driver.

10. The computer program product of claim 8, wherein the second signature is associated with a second driver.

11. The computer program product of claim 8, wherein the at least one processor further performs operations comprising:

comparing the first signature with the second signature; and determining a driver of the vehicle based on the comparing of the first signature with the second signature.

12. The computer program product of claim 8, wherein the vehicle parameters comprise speed characteristics.

13. The computer program product of claim 8, wherein the vehicle parameters comprise a geographic location.

14. The computer program product of claim 8, wherein the vehicle parameters comprise rotations per minute.

15. A computer-implemented method for driver detection, the method comprising:

receiving first vehicle data during operation of a vehicle, wherein the first vehicle data is associated with a plurality of vehicle parameters;

determining a first signature based on the first vehicle data, wherein the first signature indicates first driving behavior, wherein the first signature comprises a first waveform of captured first vehicle data, and wherein the first waveform represents changes in at least one parameter of the plurality of vehicle parameters;

receiving second vehicle data during operation of the vehicle, wherein the second vehicle data is associated with the plurality of vehicle parameters;

determining a second signature based on the second vehicle data, wherein the second signature indicates second driving behavior, wherein the second signature comprises a second waveform of captured second vehicle data, and wherein the second waveform represents changes in at least one parameter of the plurality of vehicle parameters; and performing one or more remediating actions based on the second signature based on a comparison between the first signature and the second signature.

16. The method of claim 15, wherein the first signature is associated with a first driver.

17. The method of claim 15, wherein the second signature is associated with a second driver.

18. The method of claim 15, further comprising:

comparing the first signature with the second signature; and determining a driver of the vehicle based on the comparing of the first signature with the second signature.

19. The method of claim 15, wherein the vehicle parameters comprise speed characteristics.

20. The method of claim 15, wherein the vehicle parameters comprise a geographic location.

* * * * *